PROCESS OF FLUSHING UNWANTED RESIDUE FROM A VAPOR DEPOSITION SYSTEM IN WHICH SILICON IS BEING DEPOSITED

Filed Aug. 24, 1960 2 Sheets-Sheet 1

INVENTORS
JOHN E. ALLEGRETTI
JAMES LAGO
BY Rudolph J. Anderson Jr.
ATTORNEY

INVENTORS
JOHN E. ALLEGRETTI
JAMES LAGO
BY
ATTORNEY

United States Patent Office 3,168,422
Patented Feb. 2, 1965

3,168,422

PROCESS OF FLUSHING UNWANTED RESIDUE FROM A VAPOR DEPOSITION SYSTEM IN WHICH SILICON IS BEING DEPOSITED

John E. Allegretti, East Brunswick, and James Lago, Roselle, N.J., assignors to Merck & Co., Inc., Rahway, N.J., a corporation of New Jersey Filed Aug. 24, 1960, Ser. No. 53,578
12 Claims. (Cl. 148—175)

This invention relates generally to the formation of essentially single crystals of semiconductor material and more particularly to a method for forming crystalline semiconductor material having layers of different conductivities therein separated by a transition region.

This application is a continuation-in-part of application Serial Number 27,938, filed May 9, 1960.

It is well known in the prior art that a semiconductor device which performs an active function in an electrical circuit must include at least one junction, and generally must have nonrectifying electrical connections made to it. In the prior art many methods of forming junctions in a semiconductor device and making connections to it have been disclosed. However, only two of these methods have been generally commercially accepted. The two presently recognized methods are fusing or alloying and diffusion.

By carrying out each of the above methods to form a junction, the resulting semiconductor device so formed is limited in the applications to which it may be put by the inherent electrical characteristics exhibited by any junction formed by the particular method chosen.

The electrical characteristics of any junction are determined by such parameters as resistivity of the semiconductor material, lifetime of the injected carriers, thickness of the semiconductor material, the relationship between applied voltage and junction capacitance, and the like. Each of these parameters is affected by the particular method chosen to form the junction.

When using the alloying method of forming junctions, and particularly a P-N junction, the above parameters are affected as follows: (1) The resistivity of the regrown or recrystallized regions of the semiconductor device is low and is fixed and determined solely by the phase diagram of the semiconductor material and the material or materials which are utilized to form the regrown region; (2) the thickness of the regrown region obtainable is determined by the phase diagram above referred to; (3) the alloying process can be utilized to form only a step-type P-N junction; (4) lifetime is lowered by alloy junction formation. In order to form a junction by the alloying process, the semiconductor body must be subjected to relatively high temperatures to provide a molten region from which the regrown region is ultimately formed. The lifetime which semiconductor material exhibits at the time of its formation is lowered by subsequently subjecting it to commercial high temperature treatment procedures; (5) in performing the alloying step, a semiconductor body is usually subjected to various treatments and as a result thereof is exposed to foreign objects which may contaminate the semiconductor body during junction formation.

It is also quite difficult to form large area junctions by the use of the alloying process. Various attempts have been made to overcome this limitation to this process but these attempts have not been highly successful. It becomes important to have large area junctions when the semiconductor device is to be utilized for the transmission of large amounts of electrical power.

When using the diffusion method for the formation of junctions, and particularly P-N junctions, within a semiconductor body, the above parameters may be affected as follows: (1) The resistivity of the converted region is determined solely by the concentration of the source of active impurity material present at the surface of the body and the temperature at which the diffusion is accomplished. Once these two factors are established with a given semiconductor material, the resistivity follows a predetermined curve normally referred to as an error function curve; (2) only a graded type P-N junction may be formed; (3) the lifetime of the minority carriers is substantially reduced. This results since diffusion of active impurities into a semiconductor body can be accomplished only by subjecting that body to high temperatures for relatively long periods of time.

Another method of junction formation which has been used is that of pulling a crystal from a melt of semiconductor material. Although it is possible to produce junctions by utilizing this method, many problems have been encountered and this process has, therefore, not been utilized to any great degree in commercially producing junctions for use in semiconductor devices. Some of the problems encountered in this method are inability to form planar junctions, doping the melt from which the crystal is pulled, temperature control, rate of pull, junction location, and subsequent processing to produce semiconductor devices.

Accordingly, it is an object of the present invention to provide a method of forming single crystal semiconductor material containing junctions from which semiconductor devices can be easily and inexpensively manufactured.

It is another object of the present invention to provide a method of forming single crystal semiconductor material having layers of controlled resistivity material therein, each of which is separated from adjacent layers by a junction or transition region.

It is another object of the present invention to provide a method of forming a single crystal of semiconductor material having P-N junctions which exhibit desired predetermined electrical characteristics.

It is another object of the present invention to provide a method of producing a single crystal semiconductor body having layers therein of varying conductivity, the conductivity variation being accomplished in a controlled, predetermined fashion.

It is another object of the present invention to provide a method of forming single crystal semiconductor material which permits the active impurity concentration at any given point within the crystal body to be varied in a predetermined fashion during the growth of the crystal.

It is a further object of the present invention to provide a method of forming single crystal semiconductor material from which a semiconductor device may be formed without heat treatment, thereby maintaining high lifetime characteristics.

It is a further object of the present invention to provide a method wherein transition regions may be formed within a body of single crystal semiconductor material as the material is initially formed.

It is still a further object of the present invention to provide a method for making semiconductor devices which permit the formation of any type junction or combination of junctions which may be desired.

It is still a further object of the present invention to provide a method of forming P-N junctions having any desired area within a body of semiconductor material.

According to one aspect of the present invention, a decomposable source of semiconductor material along with atoms of an active impurity material, all in the vapor phase, are introduced into a reaction chamber containing a heated semiconductor starting element. After a predetermined period of time, during which atoms of the semiconductor material and active impurity material have been deposited upon the starting element as a result of the decomposition of the source thereof, the starting element and the layer of deposited material thereon are disassociated from the source of active impurity in the reaction chamber and from the semiconductor material. Thereafter, a decomposable source of semiconductor material and active impurity atoms are once more brought into contact with the starting element and the layer formed thereon to thereby deposit a subsequent layer of semiconductor material along with active impurity atoms.

More specifically, in accordance with one embodiment of the method of the present invention, a starting element of single crystalline semiconductor material is supported within a reaction chamber. The starting element is heated to a temperature below its melting point and a gaseous medium is introduced into the interior of the reaction chamber to remove surface contaminants from the starting element. A decomposable source of semiconductor material in the vapor phase is then introduced into the chamber along with material containing atoms of an active impurity.

The semiconductor source material and active impurity material is decomposed in the vicinity of the surface of the heated starting element and atoms of the semiconductor material along with atoms of the active impurity are deposited upon the starting element in essentially single crystalline form. After a predetermined time, the source of semiconductor material and active impurity material is removed from the chamber and a flushing gas is introduced into the reaction chamber in order to remove atoms of the active impurity which may have been deposited upon the interior of the chamber. Thereafter, additional source material and atoms of active impurity are introduced into the chamber and another layer of semiconductor material is deposited in essentially single crystalline form contiguous with the layer of material which has been previously deposited. The two layers of material are separated from each other by a transition region. The starting element with the layers of essentially single crystalline material is then cooled and removed from the chamber.

Additional objects and advantages of the present invention may be determined from the following description taken in conjunction with the accompanying drawing which is presented by way of example only and is not intended as a limitation upon the scope of the present invention, and in which:

FIG. 1 schematically illustrates one apparatus which may be used in carrying out the method of the present invention;

The method of the present invention may be utilized in order to form essentially single crystalline layers of any type semiconductor material, or combinations of semiconductor materials from which semiconductor devices may be manufactured. For example, such semiconductor materials as germanium, silicon, silicon carbide, group III–V intermetallic compounds such as gallium arsenide, indium phosphide, aluminum antimonide, indium antimonide and the like. The method of the present invention may also be utilized in forming layers of semiconductor materials of combinations of the above. However, for purposes of description only, the following discussion of the method of the present invention will be made with particular reference to the use of silicon as the semiconductor material.

In practicing the method of the present invention, there is first provided a single crystal starting element of semiconductor material and, in the presently preferred embodiment of the present invention, the single crystal starting element is silicon. The single crystal starting element is formed from a rod of single crystal silicon material which has been refined, for example by zone refining, to a predetermined form as is well known in the prior art. The starting element may then be taken from this rod by cutting a portion therefrom or by grinding the rod into the desired shape. Preferably, however, the starting element is formed in a crystal pulling apparatus and by methods well known to the prior art. A starting element of single crystal silicon material, formed in this manner, has a diameter on the order of approximately five (5) millimeters and may be of any desired length.

Although it is not essential, the single crystal starting element is preferably crystallographically oriented in a predetermined fashion. The crystallographic orientation may be obtained in accordance with practices well known in the prior art.

After the single crystal starting element has been formed, it is then placed in an etching solution for a predetermined time to remove any contaminants which may be present thereon. Although various etching solutions are well known in the prior art, it is preferable to etch with a solution of nitric acid and hydrofluoric acid. After etching, the starting element is washed and dried in accordance with well known techniques.

Figures 1, 2, 4:
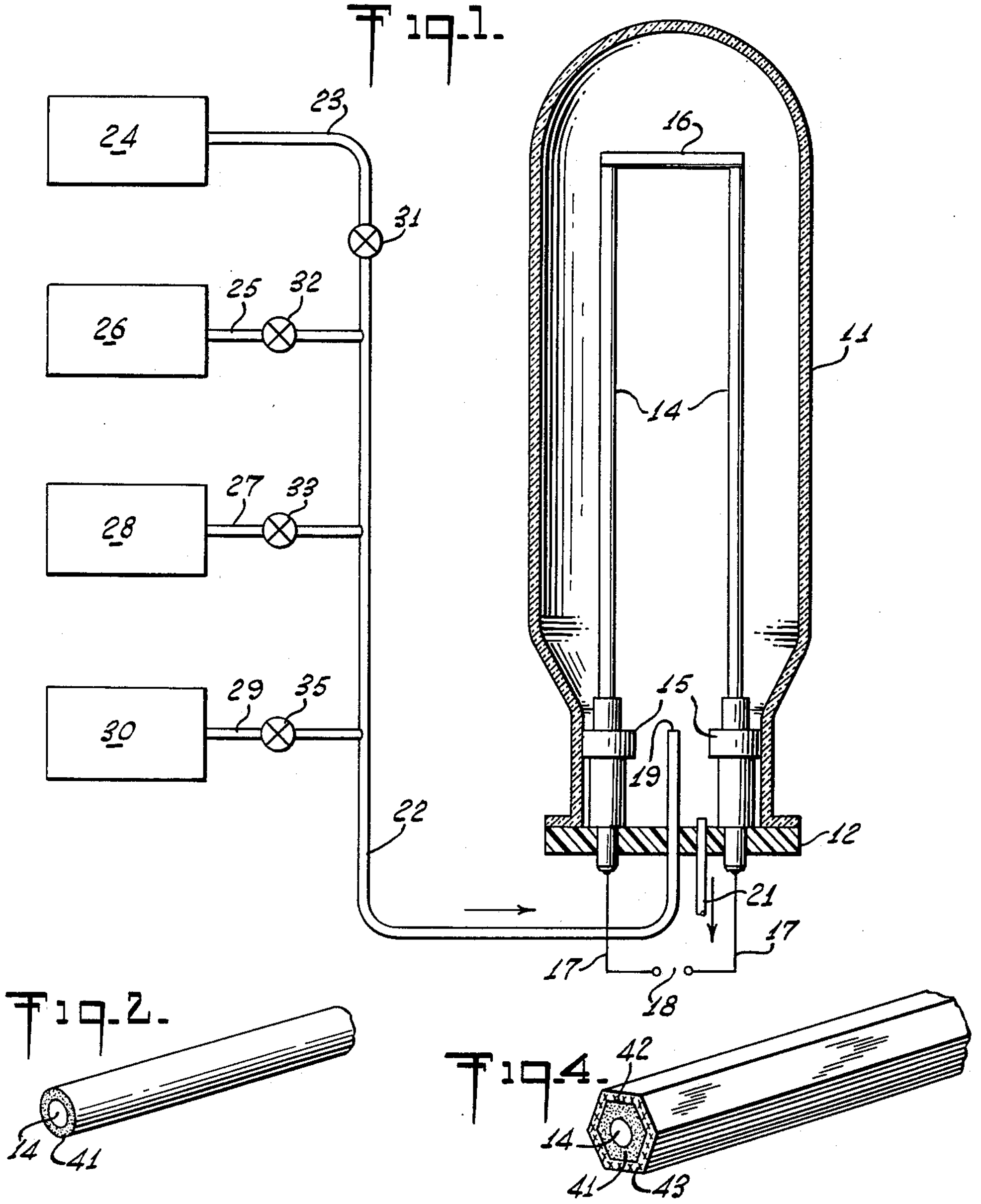
FIGS. 2 through 4 illustrate a semiconductor element formed in accordance with the method of the present invention at the various stages of formation thereof.

Referring now more particularly to FIG. 1 of the drawings, there is illustrated in schematic representation, an apparatus which may be utilized in carrying out the method of the present invention. As is llustrated in FIG. 1, a bell jar 11 is sealed to a base 12 to form a reaction chamber 10 within which the silicon starting element 14 is mounted. As is illustrated, two starting elements 14 are utilized in the presently preferred embodiment of the present invention. It is to be understood, however, that any desired number of starting elements may be used. The starting elements 14 are mounted within electrically conductive mounting chucks 15 and a bridge 16 of electrically conductive material, such as graphite or preferably silicon, is connected to the upper ends of the starting elements to provide a path for current flow as explained below. Electrical connections are made by way of leads 17 which are attached to the electrically conductive chucks 15 and which terminate in the terminals 18. A source of electrical energy (not shown) is connected to the terminals 18 to resistively heat the starting elements 14, as will be more fully discussed hereinafter. A nozzle 19 extends above the base 12 and into the interior of the reaction chamber 10 formed by the bell jar 11. An exhaust port 21 extends through the base 12 to permit the exhaustion of spent reaction gases from the interior of the bell jar 11, as will be more fully described hereinafter. A conduit 22 is connected to nozzle 19 and extends through the base 12 of the reaction chamber. An additional conduit 23 interconnects with conduit 22 and with the source of carrier gas 24. Conduit 25 interconnects between the conduit 22 and source of semiconductor material 26.

A conduit 27 interconnects the source of active impurity material 28 with conduit 22 while a conduit 29 interconnects the source of flushing gas 30 with the conduit 22. Valves 31, 32, 33 and 35 are utilized to open or close each of the conduits as desired.

After the silicon single crystal starting elements 14 are mounted within the reaction chamber 10 and the electrically conducting bridge 15 is connected thereto, the starting elements 14, along with the electrically conducting bridge 15 are heated by connecting the source of electrical energy (not shown) to the terminals 18 so that current flows through the starting elements 14. As the current flows through the starting elements 14, their temperature is raised. Since silicon semiconductor material has a negative temperature resistance coefficient, it is sometimes necessary to initially heat the silicon starting elements with radiant energy imparted through the walls of the reaction chamber 10. This feature, however, for purposes of clarity of description, is not illustrated in FIG. 1.

Heating is continued until the starting elements 14 reach a predetermined temperature which, in the case of silicon, is on the order of 1250° C. as determined by optical pyrometer observation. At this point, current flow is adjusted to maintain the temperature of the starting elements substantially constant and the valve 31 is opened. This permits the carrier gas from source 24 to flow through conduits 23 and 22 and through jet 19 into the interior of the reaction chamber 10. It is preferable to utilize a reducing carrier gas, such as hydrogen, in the presently preferred embodiment of this invention where the formation of a silicon crystal is being described. As the hydrogen passes into the interior of the reaction chamber 10 and into contact with the surface of the starting elements which are maintained at the predetermined temperature, the hydrogen effects a final cleaning of the starting element surfaces to prepare them for single crystal growth as hereinafter described. Regardless of the care taken in preparation of the starting elements, it is believed that some oxidation occurs at the surface thereof from their exposure to the atmosphere. It has been theorized that at the temperatures involved, the hydrogen reduces the silicon oxide and removes any oxygen upon outflow of the hydrogen gas from the reaction chamber. Irrespective of the theory involved, good single crystallinity has been preserved in subsequently formed layers by treatment of the silicon starting elements with the hydrogen gas at elevated temperatures, as described.

After the hydrogen gas has passed through the interior of the reaction chamber 10 for a time sufficient to permit the proper cleaning of the surface of the starting elements, valve 32 is opened and semiconductor material from source 26 is mixed with the carrier gas and the resultant mixture is permitted to pass through conduits 23, 25 and 22 and into the reaction chamber through nozzle 19.

The terms thermal decomposition and thermally decomposable and the associated deposit of a product of decomposition, as used throughout this specification, are intended to be generic to the mechanisms of heat-cracking as, for example, the decomposition of silicon tetrachloride and liberation of silicon atoms through the action of heat alone and to the mechanism of high temperature reactions wherein the high temperature causes interaction between various materials with liberation of specific materials or atoms as, for example, the reaction of $$3SiHCl_3 + H_2 \xrightarrow{\Delta} 2Si + SiCl_4 + 5HCl$$

used in the presently preferred embodiment of this invention as more fully described below.

As indicated above, there is provided a source of atoms of semiconductor material. The source may be any vapor containing semiconductor atoms which, when exposed to proper temperatures, will decompose, thereby liberating such atoms which may thereupon deposit upon the surface of the starting elements employed in this process. For the use in this invention, the source material must have only the following characteristics. It must, of course, be a source of semiconductor atoms such as silicon, germanium, etc. It must be capable of thermal decomposition at an elevated temperature but below the melting point of the starting elements. Upon thermal decomposition it must permit the entrance of atoms of semiconductor material into the then existing atomic structure at the surface of the starting element in elemental form. As is apparent from these considerations, many materials may be employed as the source of semiconductor atoms. Halides of the metals which may be desired to be used in carrying out this invention have the necessary characteristics. When silicon is employed, as in the presently preferred embodiment of the invention for the purposes of description, trichlorosilane (commonly referred to as silicochloroform) is the preferred source of silicon atoms. Upon thermal decomposition, elemental silicon is liberated in accordance with the reaction above set forth.

Obviously silanes other than trichlorosilane may also be employed, if desired, since silicon is liberated upon the thermal decomposition of silanes in accordance with the reaction:

$$2H_2 + SiH_{(4-x)}Y_x \rightarrow Si + xHY + (4-x)H_2$$

where Y is any halogen and $x$ is 0 to 4.

Similarly, the halides of germanium, the Group III–V metals, etc., may be employed with appropriate consideration given to the temperature and chemical and physical properties of the starting element during deposition and their relation to the decomposition temperature and chemistry of the vapor source.

Prior to the commencement of the flow of the source of semiconductor material into the reaction chamber, the temperature of the starting elements is adjusted to a predetermined level. The temperature of the starting element during decomposition is again below the melting point of the material from which it is formed. The level is determined by the particular source material employed and the rate of the decomposition reaction. In a thermal decomposition reaction, the reaction itself will, of course, proceed at different rates depending upon temperature. Since single crystal growth is desired, some time (not accurately measurable) is required for a liberated atom from the decomposition reaction to position itself within the then forming crystal structure. Too great a supply of atoms may not permit orderly growth of the crystal and, therefore, the temperature should be such as to result in decomposition of a degree sufficient to permit an orderly arrangement of the semiconductor atoms and, hence, single crystal growth. Obviously from a commercial standpoint, there must be adequate liberated semiconductor atoms to insure crystal growth to the desired degree within a reasonable time, and hence the temperature must be adjusted to provide at least such atoms in a quantity resulting in noticeable growth.

In the case of the presently preferred embodiment of the present invention, that is, the formation of a silicon semiconductor crystal through thermal decomposition of silicochloroform, the temperature of the starting element is adjusted to approximately 1170° C. as determined from optical pyrometer observation. This temperature permits the decomposition of silicon atoms from the decomposed silicochloroform source material and the deposition thereof in the desired manner.

In accordance with the presently preferred embodiment of the present invention, approximately 240 grams of silicochloroform per hour entrained in 5.5 liters per minute of total gas flow through the reaction chamber is preferable. This mixture of silicochloroform with carrier gas results in a mol ratio of approximately 0.12. Under these conditions and operating at 1170° C., approximately 11 grams per hour of silicon is deposited upon the surface of the silicon starting elements 14 which results in a yield of approximately 22%.

To form a layer of semiconductor material of essentially single crystalline form which has the desired conductivity, the valve 33 is opened permitting the desired active impurity to join the carrier gas and semiconductor source material passing through conduit 22 and thereby enter the interior of the reaction chamber 10 and, as a result thereof, contact the surface of the semiconductor starting elements 14. The impurity material is also in a vapor phase and is a compound which, when subjected to the temperature conditions present at the surface of the silicon starting elements, will decompose and deposit atoms of the active impurity along with atoms of the elemental silicon. It has been found that the halides of the active impurity materials provide excellent sources of active impurity material which meet these conditions. In accordance with the presently preferred embodiment of the present invention, in forming a P-type layer of semiconductor material, boron trichloride is used as the active impurity source material, and when forming an N-type layer phosphorus trichloride is used as the active impurity material.

After the carrier gas and source of semiconductor material, along with the active impurity source material, has passed through the reaction chamber and contacted the surface of the semiconductor starting elements for a predetermined period of time to thereby decompose and form a layer of semiconductor material having a predetermined thickness, the valves 33 and 32 are closed to remove the source of semiconductor material and the source of active impurity from the reaction chamber 10.

Prior to forming a subsequently deposited layer of single crystal semiconductor layer having a desired conductivity and separated from the first layer by a transition region, the starting elements 14 with the first layer of silicon are preferably disassociated from the active impurity material within the reaction chamber which imparted the desired conductivity to the first layer. It has been found that the disassociation step provides a more accurate and predetermined location of the transition region and thickness of the subsequent layer and is particularly desirable where the next layer to be formed is one having a low conductivity.

It has been found that during formation of the first layer of semiconductor material some of the active impurity material contained within the reaction gases deposits upon the interior surfaces of the various parts of the reaction chamber. If this residue is permitted to remain in association with the silicon material previously formed, and durng the formation of the next layer, the location of the transition region between the layers particularly where the next layer has a low conductivity cannot always be predetermined. If the transition region cannot be accurately located, the thickness of the subsequently formed layer cannot be accurately predetermined.

It has been found that the residual active impurity material may be readily removed from the interior of the reaction chamber by flushing the entire system for a predetermined period of time.

Therefore, in accordance with the method of the present invention, the valve 35 is opened to permit flushing gas from the source 30 to enter through conduits 29 and 22 into the interior of the reaction chamber 10.

The flushing gas is chosen so that it will react with atoms of the active impurity material which are present within the interior of the reaction chamber 10 and not within the previously formed layer to form a volatile compound thereof that is swept from the chamber. At the same time, the flushing gas must be such that it will not affect the subsequent deposition of single crystal semiconductor material. If the flushing gas, when it contacts the surface of the semiconductor material which has been previously deposited, causes undue pitting or erosion of the surface of the semiconductor material, it has been found that the subsequently deposited layers of semiconductor material are not single crystalline in form. It has been found that silicon tetrachloride meets these conditions and is an excellent flushing gas. Additional flushing gases which meet the above conditions and which may be used are the effluent equilibrium gases from the reaction chamber in the above described deposition steps, silicon tetrabromide, hydrogen chloride, silicon tetraiodide, chlorine, iodine, and bromine.

Figure 10:
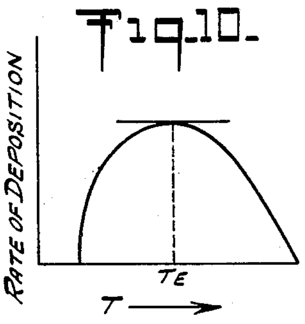
FIG. 10 is a curve illustrating one of the parameters of the method of the present invention.

When utilizing silicon tetrachloride as the flushing compound, it has been found that the temperature of the silicon starting element should be maintained at approximately 1250° C. as determined by optical pyrometer observation of the crystal. At this temperature the undesired atoms of active impurity are removed from the interior of the reaction chamber and subsequent single crystal growth is unimpeded. As can readily be seen, silicon tetrachloride is a decomposable source of silicon atoms. However, the silicon atoms liberated during flushing do not affect subsequent single crystal deposition as long as the above temperature is maintained during the flushing step. Although it is not fully understood at the present time, it is thought that at this temperature some silicon atoms from the flushing compound may be deposited and some of the silicon atoms previously deposited on the surface of the previously formed layer of single crystalline semiconductor material may be removed in an equal amount so that for all practical purposes the surface of the previously formed layer remains effectively unchanged as far as deposition of subsequent layers is concerned. This is illustrated by the curve in FIG. 10. The preferred temperature is shown at $T_e$ on the curve. If the temperature of the starting elements with the deposited material thereon is permitted to drop substantially below 1250° C., to the left of the point $T_e$, silicon atoms are deposited upon the surface of the previously formed layer. This will, therefore, affect the characteristics of the ultimately formed semiconductor body. If the temperature at the surface of the crystal is permitted to rise substantially above 1250° C., to the right of the point $T_e$, substantial numbers of atoms of the semiconductor material are removed from the surface. Although in most instances the removal of some atoms of silicon from the surface of the previously deposited layer of semiconductor material has little or no effect upon the ultimate device which is formed, this can produce deleterious results if permitted to go too far. It has, therefore, been found to be preferable to maintain the temperature of the crystals as nearly constant at the equilibrium temperature as is possible. The above described phenomenon is present when utilizing other flushing gases containing atoms of semiconductor material and, therefore, the temperature of the semiconductor material during the flushing step should be maintained relatively constant as above described.

In accordance with the presently preferred embodiment of the present invention, silicon tetrachloride is introduced into the interior of the chamber at a rate of 6 grams per minute in a flow of hydrogen gas at a rate of 5.5 liters per minute which results in a preferable mol ratio of 0.15. However, it has been found that the amount of silicon tetrachloride and the flow of gas may be varied so that a mol ratio within the range of 0.05 to 0.3 will give the desired results. This flow of carrier gas and silicon tetrachloride is continued for a time sufficient to permit the undesired atoms of the active impurity deposited within the various portions of the interior of the reaction chamber to react with the flushing gas and thereby form volatile compounds of the residual active impurity material which are swept from the interior of the chamber through the exhaust port 21. It has been found that a period of between 15 and 60 minutes is sufficient. After the flushing gas has removed the undesired atoms of active impurity, the entire system is purged with hydrogen gas by closing the valve 35 to remove the source of flushing gas from conduit 22. The hydrogen gas purge is continued for approximately 5 minutes in order to clear the system of silicon tetrachloride.

When boron has been utilized in depositing a P-type semiconductor layer upon the surface of the silicon starting elements 14 and silicon tetrachloride is utilized as a flushing gas, the silicon tetrachloride breaks down to form silicochloroform plus boron trichloride plus hydrogen plus hydrogen chloride, all of which passes from the interior of the reaction chamber through the exhaust port 21. If phosphorus has been used to form an N-type layer of semiconductor material, a similar reaction occurs with the formation of phosphorus trichloride.

After the system has been flushed, thus ridding it of the unwanted atoms of active impurity material, the temperature of the silicon material is once again lowered to approximately 1170° C. and the carrier gas, along with the source of semiconductor material and an active impurity which will impart the desired conductivity to the next successive layer of deposited semiconductor material, is introduced into the reaction chamber. For example, if the first layer of material was P-type material doped with boron and it is desired to form an N-type layer of semiconductor material of essentially single crystalline form which is integral with the P-type layer and separated therefrom by a P-N junction, then phosphorus trichloride would preferably be utilized as the source of active impurity material. When the gas containing the semiconductor material and active impurity material enters into the interior of the reaction chamber and is decomposed by the heat from the silicon supported therein, atoms of the silicon material are deposited upon the surface of the silicon previously deposited on the starting elements 14 along with atoms of phosphorus in order to form the single crystal N-type layer.

This deposition is permitted to continue for a predetermined period of time in order to provide a layer of semiconductor material having the desired thickness in order to form the subsequent semiconductor device having predetermined desired electrical characteristics.

After the desired thickness of layer of material has been deposited upon the surface of the crystal, the reaction gases are removed by closing the appropriate valves and the source of electrical current is removed from the leads 17 and the semiconductor crystals 14 are permitted to cool in a flow of the carrier gas at a rate of approximately 100° C. per minute. After the semiconductor crystals have been cooled, they may then be removed from the reaction chamber 10 and further processed in order to form semiconductor devices as will be more fully explained hereafter.

Although it is considered less desirable from a commercial or economic viewpoint, the necessary disassociation may also be accomplished by disconnecting the source of electrical energy from terminals 18 and allowing the starting elements and first layer of semiconductor material to cool to a temperature where they may be easily removed. The bell jar 11 can then be removed and the elements 14 removed and transferred to a different reaction chamber. Thereafter, the surface of the elements can be cleaned by passing the hydrogen gas through the reaction chamber as above described and then introducing a second decomposable source of semiconductor material and source of active impurity material into the reaction chamber after first heating the starting elements to the proper temperature. The active impurity source material would be chosen to impart the desired conductivity to the second layer of semiconductor material and it would be separated from the first layer by an accurately positioned transition region.

Although the above description of the method of the present invention has been given by reference to employing the disassociation step between the first and second layers of deposited semiconductor material, it is to be expressly understood that the disassociation step may be employed between the formation of some layers and eliminated between the formation of other layers depending upon the particular type of semiconductor body which is being manufactured.

As an example of a specific semiconductor device which may be formed in accordance with the method of the present invention, a P+N N+ semiconductor diode having a peak inverse voltage of 1,000 volts may be formed as follows. A silicon starting element having a diameter of approximately 5 millimeters is supported within the reaction chamber. A mixture of approximately 240 grams per hour of silicochloroform and 330 liters per hour of hydrogen carrier gas along with sufficient boron trichloride to provide approximately $10^{18}$ carriers per cc. of silicon is introduced into the reaction chamber. By maintaining the temperature at the surface of the silicon starting element at approximately 1170° C., a deposition rate of between 10 and 11 grams per hour of silicon along with atoms of boron are deposited upon the silicon single crystal starting elements.

These conditions are maintained for approximately 8 hours which will produce a 2 millimeter thick layer upon the surface of the starting element. This 2 millimeter thick layer of P-type single crystal silicon has a resistivity of approximately 0.01 ohm centimeters.

The silicochloroform-boron trichloride-hydrogen gas is then removed from the reaction chamber and silicon tetrachloride and hydrogen is utilized to flush the system and remove undesired atoms of boron which are present within the interior of the reaction chamber. The hydrogen gas is caused to flow through the chamber at approximately 5.5 liters per minute and approximately 6 grams per minute of silicon tetrachloride is contained within the hydrogen gas while the temperature of the crystal is maintained at approximately 1250° C.

After the flushing step, a mixture of reaction gas containing 240 grams per hour of silicochloroform with 330 liters per hour of hydrogen along with sufficient phosphorus trichloride to provide $10^{14}$ carriers per cc. of silicon is introduced into the reaction chamber under the conditions as above outlined. This will provide a deposition rate of between 10 and 11 grams per hour. These conditions are maintained for approximately 30 minutes in order to provide a 6 mil thick layer of N-type semiconductor single crystal material having a resistivity of approximately 45 ohm centimeters. This layer of single crystal N-type material is separated from the previously deposited P-type layer of material by a very sharp, well-defined P-N junction.

After the 6 mil thick layer of relatively high resistivity N-type semiconductor material has been deposited, the concentration of phosphorous trichloride is increased in order to provide approximately $10^{18}$ carriers per cc. of silicon and thereby produce a layer of N+ type semiconductor material having a resistivity of approximately 0.01 ohm centimeters. The thickness of the N+ layer is not critical since this layer is used primarily to provide an ohmic contact to the N-type high resistivity layer of material previously deposited. However, there will be a definite transition region between the N and N+ layers of silicon.

The source of reaction gas is then removed from the reaction chamber and the crystals are permitted to cool in a flow of carrier gas at a rate of approximately 100° C. per minute after which they are removed from the reaction chamber.

In attempting to form a high voltage semiconductor rectifier of the P+N N+ type without the utilization of the disassociation step between the P+ and N depositions, it was found that there was a region of between 12 and 15 mils of P-type semiconductor material deposited upon the P+ layer, after the phosphorus trichloride was introduced into the system, before any N-type material was deposited. Attempts have been made to utilize the introduction of hydrogen gas to overcome this but with no success. It is, therefore, apparent that the precise control over the junction location above described was dependent upon the utilization of the disassociation step above outlined.

In some particular device applications, it has been found that it is desirable to have a particular crystallographically oriented crystal face which can be made available for subsequent device manufacturing operations. One particular example where this becomes important is wherein it is desirable to form an alloyed junction upon the surface of a crystal within which there has been formed a vapor deposited junction in accordance with the method of the present invention. The desired crystallographically oriented crystal face can be made available upon a finished vapor deposited body made in accordance with the present invention by properly orienting the silicon starting element. By orienting that face of the starting element which is perpendicular to the longitudinal axis thereof along a predetermined crystallographic axis the desired crystal face in the end product can be obtained. As was above referred to, any desired crystallographic axis may be obtained by properly orienting the small seed crystal which is utilized in forming the silicon starting element as is known in the art.

If it is desired to have the (111) crystallographic plane on the face of the deposited silicon material in which junctions have been formed in accordance with the method of the present invention, the silicon starting element should be aligned so that the plane perpendicular to the longitudinal axis thereof has Miller indices whose sums equal zero, as, for example, the ($\bar{2}11$) plane. Additional crystallographically oriented faces upon the exterior of the deposited silicon material within which junctions have been formed may be obtained by properly aligning the axis of the silicon starting element. The particular axis to be utilized in order to produce any given crystallographically oriented plane at the surface is easily determined by one skilled in the art.

Figure 3:
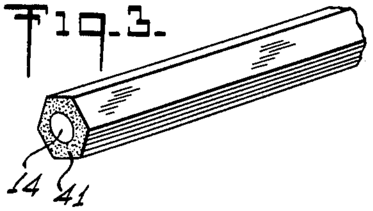

Referring now more particularly to FIGS. 2 through 4, there is illustrated a silicon single crystal element at various stages during the production of single crystal material having layers of varying conductivity, each of which is separated from the remaining layers by a transition region or junction, in accordance with the method of the present invention as above described.

After the starting element 14 has been mounted in the reaction chamber and the decomposable silicon source has been caused to react within the chamber and deposit atoms of silicon 41 (FIG. 2) upon the element 14, the silicon starting element appears as is illustrated in FIG. 3. As is therein illustrated, the starting element 14 has a layer of single crystal material 41 deposited thereon. As is shown the layer 41 has a series of flat faces which have been formed by the deposition of the silicon upon the starting element 14. These faces are formed by the silicon as it is deposited, since silicon grows upon a single crystal starting element in such a manner that it aligns itself along the crystallographic axes which are available to it as the atoms are deposited. It is in this manner that the flat faces are formed upon the surface of the crystal. Although, as is illustrated in FIGS. 3 and 4, six faces are made available, it should be understood that the number of faces appearing on a crystal is determined by the orientation of the crystal 14 along a predetermined crystallographic axis.

After the interior of the reaction chamber has been flushed with a flushing gas, for example silicon tetrachloride, and the subsequent layer of material is deposited upon the surface of the layer 41, as shown in FIG. 3, the crystal then has the appearance as illustrated in FIG. 4, in which there is shown the starting element 14, the layer 41, and an additional layer of single crystal semiconductor material 43. The layers 41 and 43 are separated by a transition region 42.

Figure 4A:
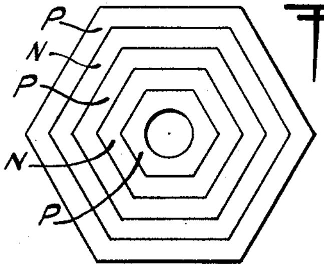

Additional layers of semiconductor single crystalline material may be deposited upon the faces of the layer 43 of the single crystal silicon body, as illustrated in FIG. 4. After additional layers have been deposited, a particular element of semiconductor material of such a configuration might be as illustrated in FIG. 4A. As is therein shown, five layers of semiconductor material have been deposited upon the initial starting element. Each of these layers may, for example, be separated by a transition region or a P-N junction from adjacent layers. For example, alternate layers, as illustrated in FIG. 4A, may be P-type material, and the intervening layers N-type material. There would be thus formed a rod having layers of material such that the end result would be P-N-P-N-P. If desired, any of the layers may be made of opposite conductivity type having any given desired resistivity, or, for example, may be made intrinsic semiconductor material for any given semiconductor device application.

After the element of semiconductor material has been formed by utilizing the method of the present invention as above pointed out, it may be sliced along the longitudinal axis thereof or transversely to the longitudinal axis in order to provide semiconductor material which may be subsequently formed into any given semiconductor device, depending upon the characteristics of the material and the transition regions separating each of the layers thereof.

As indicated above, while the specific techniques of this invention have been described with respect to silicon as the semiconductor material, it will be appreciated that the invention may be employed in the formation of semiconductor bodies having a plurality of layers of semiconductor material of differing conductivities separated by a transition region wherein each layer may be the same semiconductor material and other than silicon, for example, germanium and the like, and wherein individual layers may be differing semiconductor materials such as combinations of silicon and germanium or combinations of various Group III–V compounds such as gallium arsenide, indium antimonide and the like.

As is apparent, any such material may be used where layers thereof may be formed in accordance with the criteria taught above. It is required that a vapor source of atoms of semiconductor material and appropriate active impurity atoms therefor be provided. The vapor source must be capable of thermal decomposition at the temperature at which the starting element upon which growth will occur is heated, which temperature cannot exceed the melting point of the starting element or any deposited layer thereon. Consistent with these criteria, selection of an appropriate vapor source of the particular semiconductor material desired in any specific layer is possible. It may immediately be seen that germanium crystals may be formed from vapors of germanium halides as known in the art.

Other variations can be obtained similarly, as is apparent to one skilled in the art. It is important, of course, that single crystal growth be maintained in all instances and hence consideration must be given to the crystallography of the layer on which growth occurs and that of the grown layer when depositing layers of dissimilar materials to preserve to the degree possible the essentially single crystal characteristics.

Figure 5:
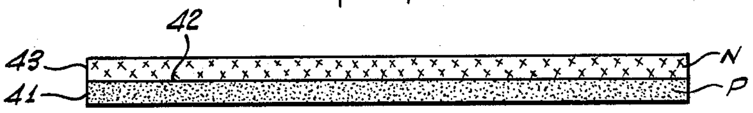
FIGS. 5 and 6 illustrate additional steps which may be carried out in producing a semiconductor device from the semiconductor material formed in accordance with the method of the present invention.
Figure 6:
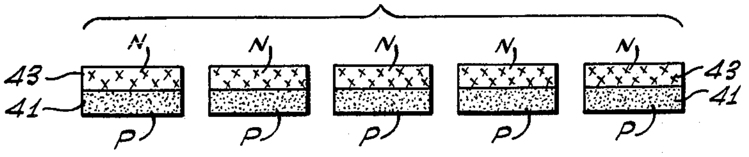

Referring now to FIGS. 5 and 6, there are illustrated two additional steps which may be taken with respect to the element as illustrated in FIG. 4, in order to form a simple P-N junction rectifier. A slab of semiconductor material having two layers of essentially single crystalline material having opposite conductivity types and separated from each other by a P-N junction is sliced from the crystal as illustrated in FIG. 4 by the use of a diamond saw, an abrasive stream, etching techniques, or other well known methods. This slicing is accomplished by forming a cut along or parallel to the lines of the longitudinal axis of the element which is also parallel to one of the faces as illustrated in FIG. 4. This then provides a slab of single crystalline semiconductor material having, for example, a P-type region 41 and an N-type region 43 of contiguous silicon semiconductor single crystalline material separated by a P-N junction 42.

The slab of material is then diced to provide a series of small wafers of semiconductor material each having the P-N junction separating the layers of N-type material and P-type material as shown in FIG. 6. After the small wafers of semiconductor material are provided as illustrated in FIG. 6, electrical connections may be made to the N and P regions to provide a diode as illustrated in FIG. 7.

Figure 7:
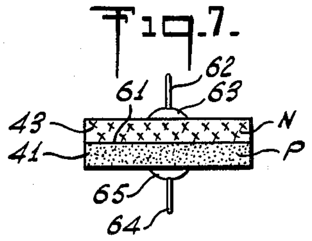
FIGS. 7 through 9 illustrate semiconductor devices which may be constructed from semiconductor material formed in accordance with the method of the present invention.

As is shown in FIG. 7 there is a diode having an N-type layer of semiconductor material and a P-type layer of semiconductor material separated by a P-N junction 61. A lead 62 is attached to the N-type material by means of solder or other material as is well known in the art. For example, a pellet of antimony doped gold 62 may be utilized upon a layer of nickel which has previously been deposited upon the N-type layer of semiconductor material in order to attach the lead 62 to the N-type layer of semiconductor material. An acceptor impurity doped pellet of gold or other similar material may be utilized to affix lead 64 to the P-type layer as is illustrated at 65.

The device as shown in FIG. 7 would then be encapsulated in a housing by any means which is well known to the prior art to provide a finished semiconductor diode.

Figure 8:
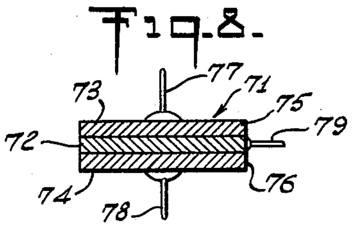

Other devices may also be manufactured by utilizing the method of the present invention as above described. For example, a transistor 71 is illustrated in FIG. 8. As is therein illustrated, a layer of semi-conductor material 72 having one conductivity type is sandwiched between layers 73 and 74 of semiconductor material which have the opposite conductivity type. For example, layer 72 may be a P-type material while layers 73 and 74 are of N-type material. Junctions 75 and 76 separate each of the three layers of semiconductor material. Electrical connections such as leads 77, 78 and 79 are then affixed in order to provide ohmic (non-rectifying) connections to layers 73, 74 and 72 respectively. The device illustrated in FIG. 8 is then encapsulated according to techniques well known in the prior art to provide a finished N-P-N transistor.

Figure 9:
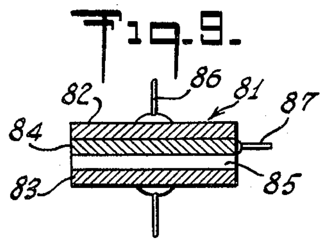

As a further example of devices which may be formed when utilizing the method of the present invention, there is illustrated in FIG. 9 a PNIP transistor 81 which includes P-type layers 82 and 83 and an N-type layer 84. A layer 85 of intrinsic semiconductor single crystalline material is sandwiched between the N-type layer 84 and the P-type layer 83. Electrical leads 86, 87 and 88 are then affixed to the layers 82, 84 and 83, respectively, and the device is then encapsulated according to well known techniques in order to provide a finished PNIP transistor.

As is illustrated by the devices shown by way of example only in FIGS. 7 through 9, any desired type of semiconductor device may be made by utilizing the method of the present invention. In each case, the semiconductor device includes at least two layers of semiconductor material having different conductivities and separated by a transition region. In some instances the transition region will be a P-N junction, while in other instances it may be a P-I or an N-I junction and in still other instances it may be a sharp transition region between layers of high and low resistivity material of the same conductivity type. In any case, however, the width of the layers of material and the location of the junction or transition region may be very accurately defined and controlled by the method of the present invention.

If it is desired, the layers of semiconductor material may also have a graded resistivity by merely varying the concentration of the particular active impurity which is included in the gaseous mixture that is being introduced into the reaction chamber during the time that any particular layer of semiconductor material is being deposited.

There has thus been disclosed a method of making semiconductor material having layers of semiconductor material of any predetermined dimension and resistivity in order to provide any desired electrical characteristics for a semiconductor device which may be manufactured therefrom.

It will be appreciated that the foregoing description of this invention is detailed for the purposes of illustration but that the invention should not be considered limited to such detail and the scope of the inveniton should be construed only in accordance with the appended claims.

We claim:

1. The method of forming a body of essentially single crystal silicon semiconductor material containing at least two layers separated by a substantially sharp, well defined transition region, by depositing atoms of silicon from a vapor phase thereof onto a silicon starting element within a reaction chamber, said method comprising the steps of (1) depositing a first layer of essentially single crystal silicon upon a heated, essentially single crystal of silicon from a first source containing decomposable compounds of silicon and of a conductivity determining active impurity, (2) removing residual solid atoms of said active impurity material adhering as a solid to the inside of said reaction chamber by introducing a flushing gas within said chamber that reacts with said solid active impurity material to form a volatile compound that is swept out of said reaction chamber with the discharge of the gases therefrom, said gas being selected from the group consisting of silicon tetrachloride, silicon tetrabromide, silicon tetraiodide, hydrogen chloride, chlorine, iodine and bromine, and (3) depositing a second layer of essentially single crystal silicon upon said first layer from a second source containing a decomposable compound of silicon in the vapor phase, whereby the initial deposit of said second layer does not include any remanent of said conductivity determining active impurity material that adhered as a solid to the interior of said reaction chamber at the conclusion of the formation of said first layer, so that the transition region between said first layer and said second layer is substantially sharp and well defined.

2. The invention as set forth in claim 1, in which the second source of decomposable compounds includes also a decomposable compound of a conductivity determining active impurity of a type opposite to that conductivity type present in said first source, whereby said second layer has a conductivity type opposite to that of said first layer, and the transition region between said first layer and said second layer is a substantially sharp, well defined P-N junction.

3. The method of forming a body of essentially single crystal silicon semiconductor material containing at least two layers separated by a substantially sharp, well defined transition region, by depositing atoms of silicon from a vapor phase thereof onto a silicon starting element within a reaction chamber, said method comprising the steps of (1) depositing from a first source a first layer of essentially single crystal silicon upon an essentially single crystal of silicon heated to a first temperature, said first source containing decomposable compounds of silicon and of a conductivity determining active impurity, and said first temperature being above the decomposition temperature of said decomposable compounds but below the melting point of silicon and such that satisfactory single crystal growth occurs on said starting element, (2) removing residual atoms of said active impurity material, present as a solid in the inside of said reaction chamber at the conclusion of the formation of said first layer, by introducing a flushing gas within said chamber that reacts with said solid residual active impurity material to form a volatile compound that is swept out of said reaction chamber with the discharge of the gases therefrom, said flushing gas being selected from the group consisting of silicon tetrachloride, silicon tetrabromide, and silicon tetraiodide, (3) maintaining, during the preceding step, the temperature at the surface of said deposited first layer at a second temperature which is (*a*) such that there is substantially an equilibrium condition between the deposit of silicon from said flushing gas onto such first layer and the removal of silicon from said first layer, but (*b*) such that there is significant reaction between said flushing gas and said solid active impurity material residually present in the inside of said reaction chamber, and (4) changing the temperature of the surface of said deposited first layer to a temperature similar to the first temperature and depositing a second layer of essentially single crystal silicon upon said first layer from a second source containing a decomposable compound of silicon in the vapor phase, whereby the initial deposit of said second layer does not include any of said conductivity determining active impurity material that was residually present as a solid in the interior of said reaction chamber at the conclusion of the formation of said first layer, so that the transition region between said first layer and said second layer is substantially sharp and well defined.

4. The invention set forth in claim 3 in which said flushing gas is silicon tetrachloride.

5. The invention set forth in claim 4 in which said second temperature is approximately 1250° C.

6. The invention set forth in claim 3 in which said flushing gas is mixed with hydrogen as a carrier gas.

7. The invention as set forth in claim 5 in which said flushing gas is mixed with hydrogen as a carrier gas, with the mol ratio of the flushing gas to the carrier gas being within the range of 0.05 to 0.3.

8. The invention set forth in claim 5 in which said decomposable compound of silicon used in the formation of said first and second layers of silicon is silicochloroform, and in which said first temperature is approximately 1170° C.

9. The invention set forth in claim 8 in which hydrogen is used as a carrier gas in the silicon depositing step, and also as a carrier gas with the flushing gas, with the mol ratio of silicochloroform to hydrogen in the silicon depositing steps being approximately 0.12, and with the mol ratio of the silicon tetrachloride to hydrogen in the residual impurity removal step being approximately 0.15.

10. In the art of preparing silicon semiconductors, wherein silicon is deposited in a reaction chamber from a vapor phase onto a heated silicon starting element within said reaction chamber, the method of removing, prior to the silicon deposition step, residual solid impurities remaining within said chamber, particularly those impurities which, if they are not removed, vaporize in the subsequent silicon deposition step and then deposit onto the heated silicon starting element along with the silicon and thereby contaminate at least the initial portion of the deposited silicon, said method comprising (1) introducing a flow of hydrogen and silicon tetrachloride gases into said reaction chamber and (2) maintaining the temperature of the silicon starting element (*a*) such that there is substantially an equilibrium condition between the deposit of silicon from said silicon tetrachloride onto said silicon starting element and the removal of silicon from said silicon starting element but (*b*) such that there is significant reaction between said gases and said solid impurities to convert said solid impurities to volatile compounds that are swept out of said reaction chamber with the discharge of the gases therefrom.

11. The invention set forth in claim 10 in which the mol ratio of silicon tetrachloride to hydrogen is within the range of 0.05 to 0.3.

12. The invention set forth in claim 10 in which the mol ratio of silicon tetrachloride to hydrogen is approximately 0.15 and said temperature is approximately 1250° C.

References Cited in the file of this patent

UNITED STATES PATENTS

| | | |
|---|---|---|
| 2,701,216 | Seiler | Feb. 1, 1955 |
| 2,763,581 | Freedman | Sept. 18, 1956 |
| 2,809,135 | Koury | Oct. 8, 1957 |

FOREIGN PATENTS

| | | |
|---|---|---|
| 1,029,941 | Germany | May 14, 1958 |